United States Patent [19]

Naganawa et al.

[11] 4,319,094
[45] Mar. 9, 1982

[54] THREE-TERMINAL POWER SUPPLY CIRCUIT FOR TELEPHONE SET

[75] Inventors: Tatsuhiro Naganawa, Yokohama; Makoto Yoshitoshi, Yokosuka; Kunihiro Kato, Yokohama, all of Japan

[73] Assignee: Nippon Telegraph & Telephone Public Corporation, Tokyo, Japan

[21] Appl. No.: 124,632

[22] Filed: Feb. 25, 1980

[30] Foreign Application Priority Data

Jul. 3, 1979 [JP] Japan ................................ 54-83438

[51] Int. Cl.³ .......................................... H04M 19/00
[52] U.S. Cl. .................................. 179/77; 179/81 R
[58] Field of Search .................. 179/81 R, 77, 81 A, 179/81 B, 84 T, 84 L, 70

[56] References Cited

U.S. PATENT DOCUMENTS 3,708,630  1/1973  Matsuda et al. ................... 179/81 A
3,800,095  3/1974  Cowpland ............................ 179/77

FOREIGN PATENT DOCUMENTS 592392  10/1977  Switzerland ...................... 179/81 B Primary Examiner—Bernard Konick
Assistant Examiner—J. A. Popek
Attorney, Agent, or Firm—Frishauf, Holtz, Goodman and Woodward

[57] ABSTRACT

A three-terminal power supply circuit for telephone set has an input terminal, an output terminal and a common terminal. The input terminal receives a DC voltage superposed with a sending or receiving signal transmitted to or from a telephone station through a subscriber line. The output terminal delivers DC power to a telephone circuit. Between the input and output terminals a constant current circuit and a discharge protection circuit are connected to each other in series. Between the output terminal and the common terminal a constant voltage circuit is connected. Between the input terminal and the common terminal an electronic switch is connected through the constant current circuit. The electronic switch is closed only when an instantaneous voltage applied between the input terminal and the common terminal is lowered to a predetermined value or a lower value. When it is closed, the electronic switch causes a short circuit in the constant voltage circuit through discharge protection circuit. This lowers the cutoff voltage applied on the input side of the power supply circuit, and both a sending signal and a receiving signal can be transmitted without being distorted.

8 Claims, 9 Drawing Figures

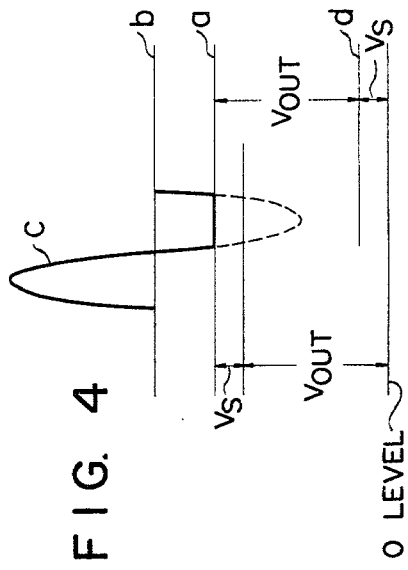
FIG. 1
(PRIOR ART)
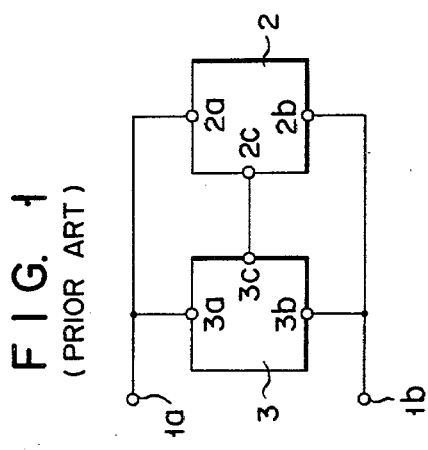
FIG. 2
(PRIOR ART)
FIG. 3
(PRIOR ART)
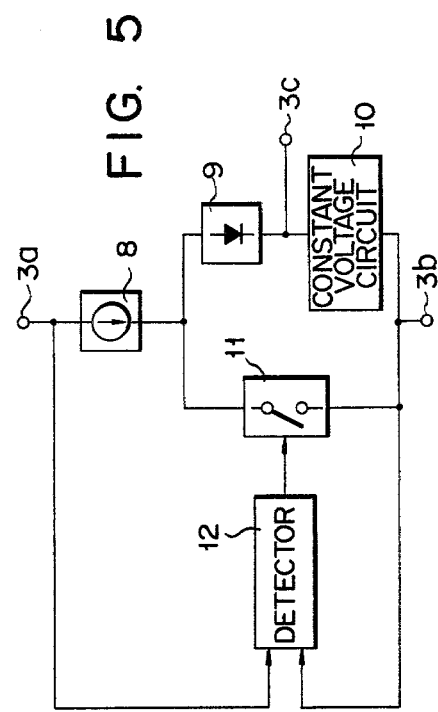
FIG. 4
FIG. 5

THREE-TERMINAL POWER SUPPLY CIRCUIT FOR TELEPHONE SET

BACKGROUND OF THE INVENTION

This invention relates to a three-terminal power supply circuit for a telephone set, which supplies a stable DC voltage to a telephone circuit without distorting both sending signals and receiving signals even if a subscriber line is long and the telephone circuit is supplied with a low voltage.

A sending signal to a telephone station and a receiving signal from a telephone station are superposed on a DC voltage, transmitted through, for example, a two-wire subscriber line and is applied to a telephone circuit through an input terminal of the telephone circuit. The telephone circuit is operated by DC power supplied through the subscriber line. If the telephone circuit is provided with an electronic circuit such as an amplifier, it needs a power supply circuit which can separate an AC component from the voltage applied through the subscriber line and which can therefore supply the electronic circuit with a stable DC voltage which does not contain the ripple component of a sending or receiving signal.

Some power supply circuits for telephone set are known. One of them is such a three-terminal power supply circuit as shown in FIG. 1. As shown in FIG. 1, telephone terminals 1a and 1b, which are to be connected to a subscriber line, are connected to terminals 2a and 2b of a telephone circuit 2. They are connected also to terminals 3a and 3b of a power supply circuit 3, respectively. The third terminal 3c of the power supply circuit 3 is connected to a terminal 2c of the telephone circuit 2. Through the telephone terminals 1a and 1b sending signals and receiving signals are transmitted. The terminals 3a and 3b of the power supply circuit 3 receive a DC voltage superposed with a transmitting and a receiving signal. The power supply circuit 3 eliminates a ripple component from the DC voltage and supplies through its terminals 3b and 3c DC power to the telephone circuit 2. This DC power drives the electronic circuits of the telephone circuit 2, such as an amplifier. The input impedance of the power supply circuit 3 should remain high enough not to attenuate sending signals to the subscriber line and receiving signals from the subscriber line and not to lower the impedance of the telephone circuit too much.

There are known three-terminal power supply circuits as shown in FIGS. 2 and 3, which are so modified to prevent attenuation of signals and excessive reduction of the impedance of a telephone circuit.

In the circuit of FIG. 2, a series circuit of an inductance 4 and a capacitor 5 is connected between an input terminal 3a and a common terminal 3b. The connection point of the inductance 4 and the capacitor 5 is used as an output terminal 3c. The input impedance of the circuit can be raised by increasing the value of the inductance 4. In addition, the inductance 4 and the capacitor 5 cooperate to achieve smoothing action to make it possible to obtain at the output terminal 3c DC power containing no ripple component.

In the circuit of FIG. 3, a series circuit of a constant current circuit 6 constituted by transistors or the like and a constant voltage circuit 7 constituted by, for example, parallel connection of a Zener diode and a capacitor is connected between an input terminal 3a and a common terminal 3b. The connection point of the constant current circuit 6 and the constant voltage circuit 7 is used as an output terminal 3c. The input impedance of this circuit can also be raised, and the constant voltage circuit 7 can supply through the output terminal 3c DC power containing no ripple component.

A modification of the known three-terminal power supply circuit of FIG. 3, which is constituted by a series circuit of one or more constant voltage elements and one or more constant current elements, is disclosed in, for example, U.S. Pat. No. 3,708,630 and Swiss Pat. No. 592,392. In the circuit of FIG. 2, however, the inductance 4 is large and heavy, and it is difficult to redesign the circuit into an IC. In the circuit of FIG. 3 the sending and receiving signals will have a clipping distortion inevitably caused by the cutoff voltage at the input side of a power supply circuit. The cutoff voltage at the input side of the power supply circuit is equal to the sum of the saturation voltage of the constant current circuit 6 and the voltage across the constant voltage circuit 7, i.e. the output voltage of the power supply circuit. The saturation voltage of the constant current circuit is the minimum voltage which should be applied to the constant current circuit in order to maintain the constant current characteristic thereof. The cutoff voltage at the input side of the power supply circuit is the minimum voltage which is necessary to maintain the constant current characteristic of the power supply circuit. If the input voltage of the power supply circuit becomes lower than the cutoff voltage, the input current will be abruptly reduced.

As shown in FIG. 4, when the input voltage of the power supply circuit of FIG. 3 is lowered to a voltage a or a lower value, the sum of the voltage Vout across the constant voltage circuit 7 and the saturation voltage Vs of the constant current circuit 6, a sending signal or a receiving signal c which is superposed with a DC voltage b applied to the input terminal 3a will have a clipping-type distortion in its waveform due to the voltage a or a clipping voltage. As a result, if the telephone circuit connected to the power supply circuit is located very far from a telephone station and the voltage across the terminals of the telephone circuit is thus low due to a voltage drop by the DC resistance of the subscriber line, the telephone circuit will not work at all or the amplitude of the signal transmitted will be limited very much.

An object of this invention is to provide a three-terminal power supply circuit for a telephone set, which eliminates the above-mentioned drawback of known circuits and which can thus supply sending and receiving signals to a telephone circuit without distorting the signals even if the DC voltage applied from the subscriber line is low.

SUMMARY OF THE INVENTION

To achieve the object, a three-terminal power supply circuit according to this invention comprises a series circuit which includes a constant current circuit and a discharge protection circuit and connected between an input terminal for receiving a DC voltage superposed with a transmitting or receiving signal and an output terminal for supplying DC power to a telephone circuit; a constant voltage circuit connected between the output terminal and a common terminal for supplying a voltage to drive the telephone circuit; an electronic switch connected between the input terminal and the common terminal through the constant current circuit, said electronic switch being closed only when an instantaneous voltage applied between the input terminal and the common terminal is lowered to a predetermined value or a lower value, to thereby short-circuit the constant voltage circuit through the discharge protection circuit and thus to reduce a cutoff voltage at the input side of the power supply circuit; and detector means connected between the input terminal and the common terminal for detecting whether the instantaneous voltage applied to the input terminal is higher or lower than a predetermined value and for opening or closing the electronic switch.

With the three-terminal power supply circuit of the above-described structure it is possible to reduce the cutoff voltage at the input side. When the instantaneous voltage between the input-side terminals becomes equal to or lower than the sum of the saturation voltage of the constant current circuit and the voltage across the constant voltage circuit, the electronic switch is closed to be connected to the constant current circuit in series between the input-side terminals. Then the voltage across the constant current circuit is higher the saturation voltage and a constant current characteristic of the power supply circuit is maintained. The three-terminal power supply circuit does not distort sending or receiving signals even if a telephone circuit connected to it is located very far from a telephone station and the DC voltage between the input-side terminals is low due to a voltage drop caused by an increase of DC resistance of the subscriber line. The power supply circuit comprises elements which are suitable for fabricating circuits such as a current mirror in the form of a monolithic IC. It would not become so large or so expensive if the number of its constituent elements increases. It can therefore be used for telephone sets of the general type.

BRIEF DESCRIPTION OF THE DRAWINGS

FIG. 1 is a circuit diagram showing the fundamental structure of a known three-terminal power supply circuit;

FIG. 2 is a circuit diagram of a known three-terminal power supply circuit;

FIG. 3 is a circuit diagram of another known three-terminal power supply circuit;

FIG. 4 is a diagram illustrating the relationship between a cutoff voltage at the input-side of a known power supply circuit and waveform distortion of a transmitting or receiving signal superposed on a DC voltage;

FIG. 5 is a block circuit diagram of an embodiment of this invention;

DETAILED DESCRIPTION

Figure 6:
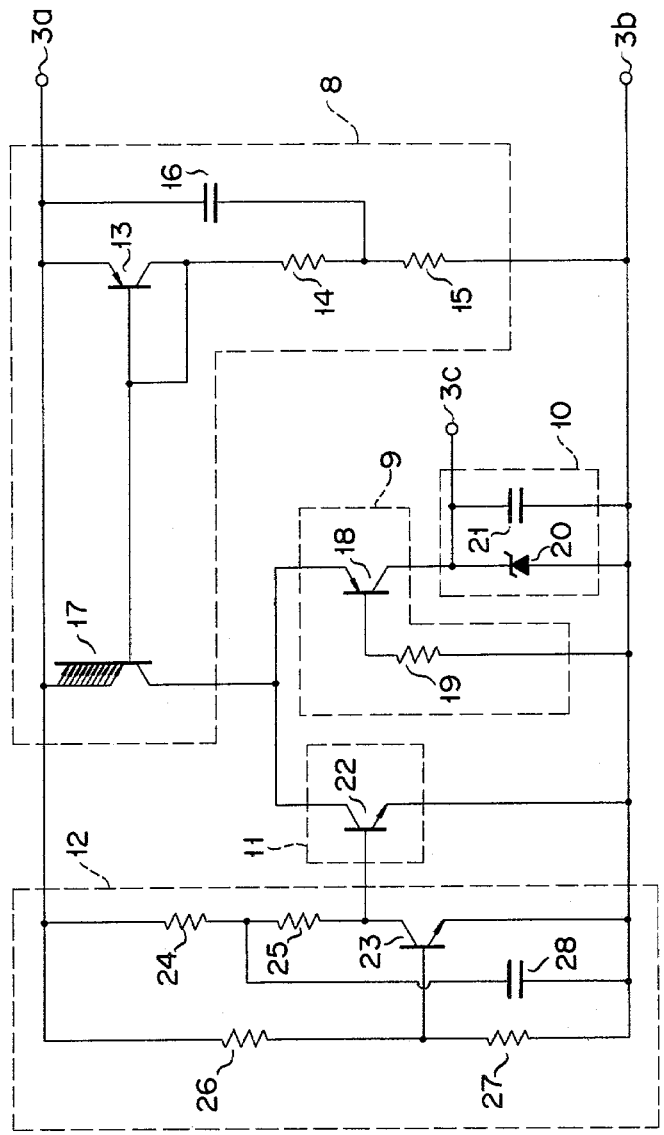
FIG. 6 is a circuit diagram of the embodiment shown in FIG. 5.

Now referring to the accompanying drawings, an embodiment of the invention will be described. As shown in FIG. 5, a series circuit of a constant current circuit 8 and a discharge protection circuit 9 is connected between an input terminal 3a and an output terminal 3c, and a constant voltage circuit 10 is connected between the output terminal 3c and a common terminal 3b. Between the input terminal 3a and the common terminal 3b there is connected a detector 12 for detecting an instantaneous voltage applied between the input-side terminals. Between the input terminal 3a and the common terminal 3b an electronic switch 11 is connected in series with the constant current circuit 8. The switch 11 is closed when the detector 12 detects that the instantaneous voltage becomes equal to or lower than the sum of the saturation voltage of the constant current circuit 8 and the output voltage of the constant voltage circuit 10. Suppose the forward voltage of the discharge circuit 9 is negligibly low. Then, the switch 11 remains open so long as the instantaneous voltage applied between the input-side terminals 3a and 3b is higher than the sum of the saturation voltage Vs of the constant current circuit 8 and the output voltage Vout of the constant voltage circuit 10. As long as the electronic switch 11 is open, the current supplied to the constant current circuit 8 from the input terminal 3a flows through the discharge protection circuit 9 to the constant voltage circuit 10. Under this condition the constant voltage circuit 10 keeps on supplying a constant output voltage Vout.

When the instantaneous voltage applied between the input-side terminals 3a and 3b becomes equal to or lower than the sum of the saturation voltage Vs and the output voltage Vout, the detector 12 closes the electronic switch 11. As a result, the current starts flowing from the constant current circuit 8 to the common terminal 3b through the electronic switch 11, thus short-circuiting the constant voltage circuit 10. The cutoff voltage at the input side of the power supply circuit is therefore reduced to the saturation voltage Vs of the constant current circuit 8. In other words, the cutoff voltage is reduced by a value corresponding to the output voltage Vout of the constant voltage circuit 10 and becomes lower to clip level d as shown in FIG. 4. A transmitting or receiving signal superposed on the DC voltage is therefore supplied to a telephone circuit connected to the power supply circuit, not being distorted at all. While the electronic switch 11 is closed, the output voltage between the output-side terminals 3b and 3c is held constant by the discharge protection circuit 9 and by the charge voltage of a capacitor which comprises the constant voltage circuit 10.

As described above, in the known power supply circuit as shown in FIG. 3, the cutoff voltage at the input side is equal to the sum of the saturation voltage of the constant current circuit 6 and the output voltage of the constant voltage circuit 10. By contrast, in the power supply circuit of FIG. 5 the cutoff voltage at the input side of the power supply circuit can be reduced to the saturation voltage of the constant current circuit 8. The power supply circuit of this invention can therefore supply a sending or receiving signal which is not distorted at all and whose amplitude is larger than that of a signal produced by the known power supply circuit, by the value which corresponds to the output voltage of the constant voltage circuit 10.

The power supply circuit of FIG. 5 is more specifically illustrated in FIG. 6. The constant current circuit 8 includes a transistor 13 and a transistor 17. The transistor 13, which is diode-connected, has its emitter connected to the input terminal 3a. The transistor 17 has an emitter size ten or more times greater than that of the transistor 13. These transistors 13 and 17 constitute a current mirror. Between the collector of the transistor 13 and the common terminal 3b there are connected two resistors 14 and 15 in series. To a series circuit of the transistor 13 and the resistor 14 a capacitor 16 is connected in parallel. DC current flows through the transistor 13, which corresponds to the DC voltage applied between the input-side terminals 3a and 3b. But AC current flows through the by-pass capacitor 16 and no AC current flows through the transistor 13. The transistor 13, resistors 14 and 15 and capacitor 16 therefore constitute a control circuit for controlling a bias current which flows in the base of the transistor 17. In the emitter of the transistor 17 there flows DC current which is proportional to the emitter current of the transistor 13 and the emitter size thereof. This DC current further flows from the output terminal 3c to a telephone circuit or the like (not shown) through the discharge protection circuit 9. The output voltage Vout can therefore be maintained between the output-side terminals 3c and 3b. Under this condition the transistor 17 holds the constant current circuit 8 at a high impedance.

The discharge protection circuit 9 comprises a transistor 18 and a resistor 19 connected at one end to the base of the transistor 18. The other end of the resistor 19 is connected to the common terminal 3b, and the collector of the transistor 18 is connected to the constant voltage circuit 10.

The constant voltage circuit 10 comprises, for example, a Zener diode 20 of such a polarity as shown in FIG. 6 and a capacitor 21 connected to the Zener diode 20 in parallel. The output of this parallel circuit is delivered as a constant voltage output Vout from the output-side terminals 3c and 3b.

The electronic switch 11 comprises, for example, a transistor 22 the collector of which is connected to the collector of the transistor 17 of the constant current circuit 8 and the emitter of which is connected to the common terminal 3b.

The detector 12 includes a series circuit of resistors 24 and 25 and a transistor 23, which is connected between the input terminal 3a and the common terminal 3b. The connection point of the collector of the transistor 23 and the resistor 25 is connected to the base of the transistor 22 of the electronic switch 11. Connected in parallel to said series circuit of the resistors 24 and 25 and the transistor 23 is a series circuit which comprised of two resistors 26 and 27. The connection point of these resistors 26 and 27 is connected to the base of the transistor 23. A capacitor 28 is connected in parallel to the series circuit comprised of the resistor 25 and the transistor 23.

Now it will be described how the electronic switch 11 and the detector 12 operate.

An instantaneous voltage applied between the input-side terminals 3a and 3b is divided by the resistors 26 and 27. And the voltage across the resistor 27 is applied between the base and emitter of the transistor 23. As long as the instantaneous voltage is higher than the sum of the saturation voltage Vs of the constant current circuit 8 and the output voltage Vout of the constant circuit 10, the transistor 23 is conductive and the electronic switch 11 remains open. As a result, the current supplied to the input terminal 3a is supplied to the constant voltage circuit 10 through the discharge protection circuit 9, and the constant voltage circuit 10 supplies the output voltage Vout to the telephone circuit (not shown).

When the instantaneous voltage applied between the input-side terminals 3a and 3b becomes equal to or lower than the sum of the saturation voltage Vs of the constant current circuit 8 and the output voltage Vout of the constant voltage circuit 10, the transistor 23 of the detector 12 is rendered non-conductive. As a result, the electronic switch 11 is closed. The current therefore flows from the constant current circuit 8 to the common terminal 3b through the electronic switch 11, thereby short-circuiting the constant voltage circuit 10. Then, the cutoff voltage at the input side of the power supply circuit is reduced to the saturation voltage Vs of the constant current circuit 8. The power supply circuit can therefore supply with the telephone circuit with a constant DC voltage, without distorting the signal superposed on a DC voltage even if the DC voltage applied to the input-side terminals 3a and 3b are lowered. The threshold voltage to close the electronic switch 11 is properly determined by selecting the ratio of voltage division which is achieved by the resistors 26 and 27.

Figure 7:
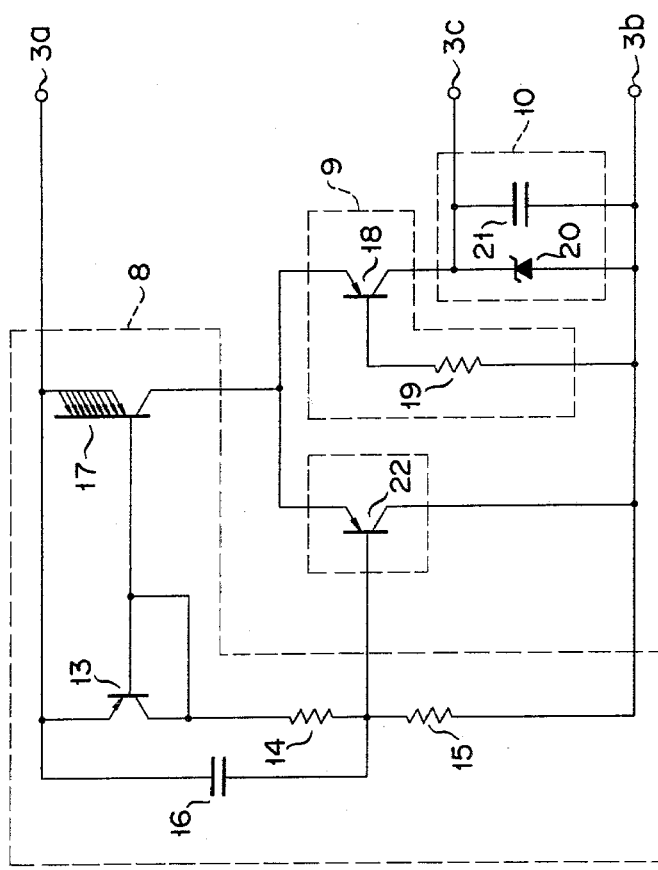
FIG. 7 is a circuit diagram of another embodiment of this invention.

The power supply circuit of FIG. 5 may be modified as illustrated in detail in FIG. 7. In FIG. 7, like or the same elements will be denoted by like or the same numerals as used in FIG. 6, and such like or the same elements will not be described in detail. The power supply circuit of FIG. 7 will be described on the assumption that the forward voltage of a discharge protective circuit is negligibly low.

As shown in FIG. 7, a transistor 22 which comprises an electronic switch 11 has its base connected to the connection point of resistors 14 and 15 of a constant current circuit 8. The ratio of the value of the resistor 14 to that of the resistor 15 is so selected that a DC voltage between the input terminal 3a and the base of the transistor 22 is made equal to the sum of the saturation voltage Vs of a transistor 17 and the absolute value of the forward voltage Vbe between the emitter and base of the transistor 22.

The transistor 22, i.e. the electronic switch 11, remains non-conductive as long as an instantaneous voltage applied across the input-side terminals 3a and 3b is higher than the sum of the forward base-emitter voltage Vbe of the transistor 22 which is a negative value in a PNP transistor and the voltage across a capacitor 16 and the output voltage Vout of a constant voltage circuit 10. In other words, the transistor 22 remains non-conductive as long as the value obtained by subtracting the sum of the voltage across the capacitor 16 and the output voltage Vout from the instantaneous input voltage is higher than the base-emitter forward voltage Vbe of the transistor 22. The current flowing through the constant current circuit 8 therefore flows to the constant voltage circuit 10 through a discharge protection circuit 9, and a constant output voltage is supplied from the output-side terminals 3b and 3c.

On the other hand, as long as the instantaneous input voltage is equal to or lower than the sum of the forward base-emitter voltage Vbe of the transistor 22, the voltage across the capacitor 16 and the output voltage Vout of the constant voltage circuit 10, the transistor 22 remains conductive. In other words, the transistor 22 remains conductive as long as the value obtained by subtracting the sum of the voltage across the capacitor 16 and the output voltage Vout from the instantaneous input voltage is equal to or lower than the forward base-emitter voltage Vbe of the transistor 22. In this case, the constant voltage circuit 10 is short-circuited through the discharge protection circuit 9, and the current flowing in the constant current circuit 8 flows to common terminal 3b through the electronic switch 11, whereby the cutoff voltage at the input side of the power supply circuit becomes equal to the saturation voltage Vs of the constant current circuit 8.

With the circuit of FIG. 7 it is therefore possible to determine the threshold voltage to close the electronic switch 11 merely by changing the ratio in resistance of the resistor 14 to the resistor 15 to thereby apply a proper voltage between across the capacitor 16. As a result, the power supply circuit can supply a telephone circuit with a transmitting or receiving signal superposed on the instantaneous DC voltage applied between the input-side terminals 3a and 3b, without distorting the signal, even if the instantaneous input voltage becomes lower than a cutoff voltage of a known power supply circuit.

Figure 8:
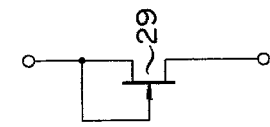
FIGS. 8 and 9 are circuit diagrams of constant current circuits which may be used in the embodiments of this invention other than those shown in FIGS. 5-7.
Figure 9:
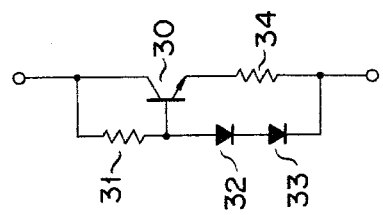

The constant current circuit 8 of both embodiments of FIGS. 6 and 7 may comprise an FET 29 of such a known type as shown in FIG. 8. Or it may comprise, as shown in FIG. 9, a transistor 30, a resistor 31 which is connected between the collector and base of the transistor 30 and a series circuit of a resistor 34 and diodes 32 and 33 of such polarity as shown in FIG. 9 which is connected between the base and emitter of the transistor 30.

In the embodiments of FIGS. 6 and 7, some of the transistors used are of the PNP type, and the others are of the NPN type. Needless to say, the PNP transistors can be replaced by NPN transistors, and the NPN transistors by PNP transistors.

What we claim is:

1. A three-terminal power supply circuit for a telephone set, comprising:
    an input terminal for receiving a DC voltage superposed with a transmitting or receiving signal; an output terminal for supplying DC power to a telephone circuit; and a common terminal;
    a series circuit which includes a constant current circuit and a discharge protection circuit, said series circuit being connected between the input terminal and the output terminal;
    a constant voltage circuit connected between the output terminal and the common terminal for supplying a voltage to drive the telephone circuit;
    an electronic switch coupled between the input terminal and the common terminal through the constant current circuit, said electronic switch being closed only when an instantaneous voltage applied between the input terminal and the common terminal becomes equal to or lower than a predetermined value to thereby short-circuit the constant voltage circuit through the discharge protection circuit and to thus reduce a cutoff voltage at the input side of the power supply circuit, said discharge protection circuit preventing current flow from said constant voltage circuit to said electronic switch; and
    detector means connected between the input terminal and the common terminal and having an output connected to an input of the electronic switch for controlling the opening or closing of the electronic switch, the detector means detecting whether the instantaneous voltage between the input terminal and the common terminal is higher or lower than said pretermined value and opening the electronic switch when the detected instantaneous voltage is higher than said predetermined value, or closing the electronic switch when the detected instantaneous voltage is equal to or lower than said predetermined value.

2. The three-terminal power supply circuit according to claim 1, wherein said constant current circuit comprises a first diode-connected transistor whose emitter is connected to said input terminal, a second transistor connected to the first transistor to form a current mirror; a series circuit comprised of first and second resistors and connected between the collector of the first transistor and said common terminal and a capacitor connected in parallel with a series circuit of the first transistor and the first resistor and constituting a control circuit for controlling the bias current of the second transistor, jointly with the first transistor and the first and second resistors, the current of said constant current circuit remaining unchanged in spite of a rapid variation of instantaneous voltage applied between said input terminal and said common terminal and being changed according to a slow variation of the DC voltage applied to said input terminal and said common terminal; and said electronic switch comprises a transistor whose emitter and collector are connected between said input terminal and said common terminal through said constant current circuit and whose base is connected to said detector means.

3. The three-terminal power supply circuit according to claim 2, wherein the transistor of said electronic switch has its emitter connected to the collector of said second transistor and its base connected to the connection point of the first and second resistors of said constant current circuit, a reference voltage for opening or closing said electronic switch appearing across the capacitor of said constant current circuit, said reference voltage being a function of the resistance ratio between said first and second resistors of said constant current circuit.

4. The three-terminal power supply circuit according to claim 1, wherein said discharge protection circuit comprises a transistor whose emitter and collector are connected between said constant current circuit and said output terminal, and a resistor which is connected between the base of the transistor of said discharge protection circuit and said common terminal.

5. The three-terminal power supply circuit according to claim 1, wherein said detector means comprises a series circuit constituted by first and second resistors for dividing the instantaneous voltage applied to said input terminal and a transistor whose base is connected to the connection point of said first and second resistors and whose collector and emitter are connected between the input of the electronic switch and the common terminal, said transistor closing said electronic switch only when the voltage across said second resistor becomes lower than the base-emitter forward voltage.

6. The three-terminal power supply circuit according to claim 5, wherein the ratio in resistance between the first and second resistors of said series circuit determines a reference voltage for opening and closing said electronic switch.

7. The three-terminal power supply circuit according to claim 1, wherein said constant voltage circuit includes a capacitor connected between the output terminal and the common terminal.

8. The three-terminal power supply circuit according to claim 7, wherein said constant voltage circuit further comprises a zener diode connected in parallel with said capacitor of said constant voltage circuit.

* * * * *